Jan. 23, 1962     E. R. DUDLEY     3,018,437
MOTION AND VOID CONTROL DEVICE
Filed Dec. 19, 1958
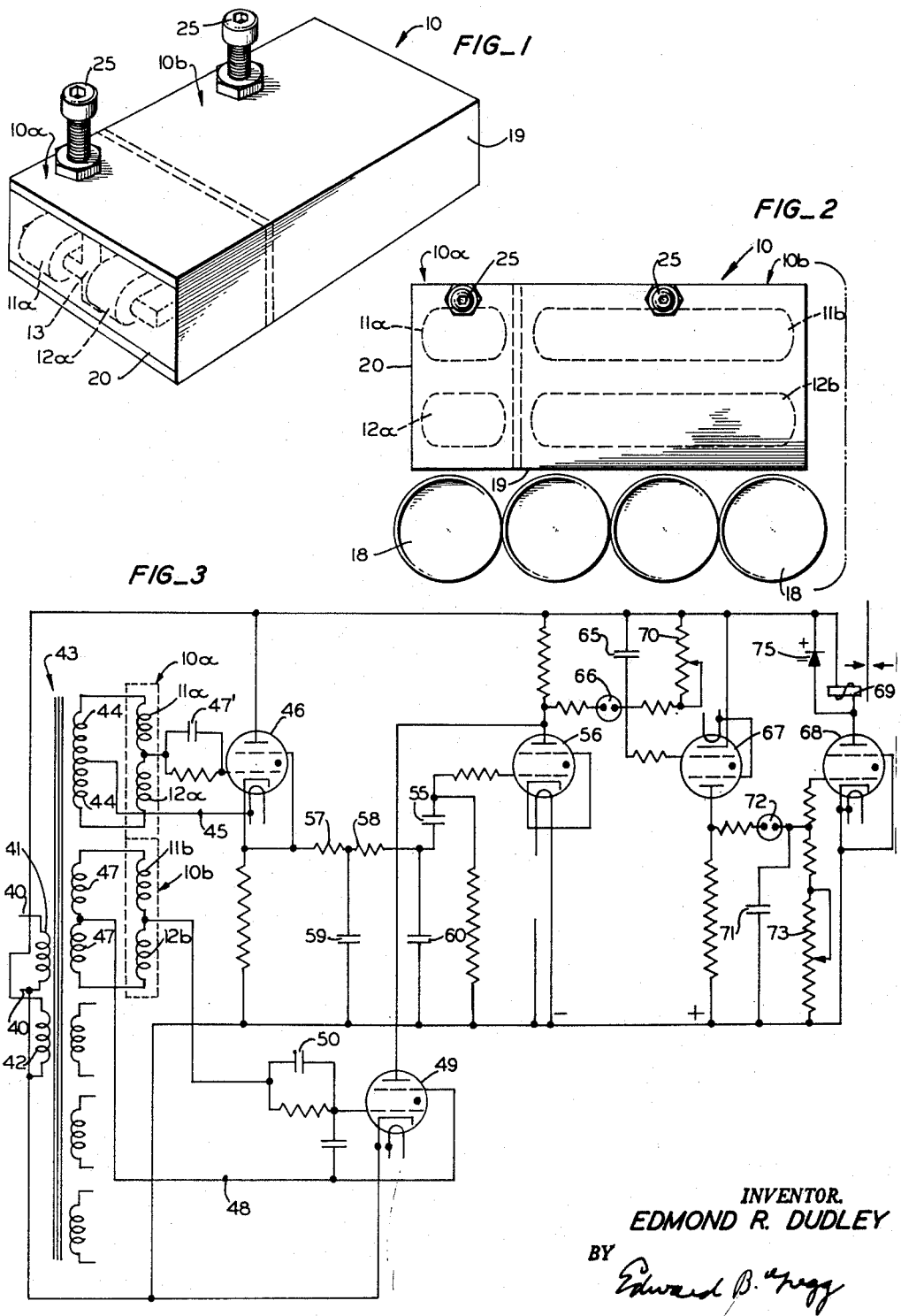
INVENTOR.
EDMOND R. DUDLEY
BY
ATTORNEY

United States Patent Office 3,018,437
Patented Jan. 23, 1962

3,018,437
MOTION AND VOID CONTROL DEVICE
Edmond R. Dudley, Santa Clara, Calif., assignor to Peerless Equipment Company, Mountain View, Calif., a corporation of California
Filed Dec. 19, 1958, Ser. No. 781,742
5 Claims. (Cl. 324—34)

This invention relates to a control system which is useful in the control of can making machinery and canning machinery, wherein can bodies are moved continuously to and from machines such as closing machines (which apply covers to cans), filling machines (which fill cans with product), can lifters, can markers, can testers, etc. The invention is also applicable to other industrial processes which require control of movement of metal objects.

This application is a continuation-in-part of my copending application Serial No. 686,915, entitled "Flow Control Device," filed September 30, 1957.

It is desirable in regulating and controlling the movement of cans in a cannery, to sense the existence or nonexistence of motion of can bodies; to sense voids in a moving line of can bodies; and to control machines appropriately. For example if empty cans are moving toward a filler, and a jam occurs which stops the supply of cans to the filler, it is desirable to stop the filler.

In a control system intended to perform such a function (i.e., to sense a cessation of movement, and to control machinery appropriately), it is also desirable to sense the difference between a cessation of movement and the presence of a void in the line of can bodies.

In accordance with the preferred embodiment of the present invention a single circuit (having suitable sub-circuits) and a single sensing unit (having two sensing heads) are employed to sense, (1) the existence or nonexistence of motion of metal objects such as cans, (2) the presence or absence of voids in a file or line of metal objects such as cans, and (3) to operate a suitable control instrumentality such as a relay whereby a signal is actuated and/or a machine is stopped, and/or some other appropriate event is caused to occur.

One form of the invention is illustrated by way of example in the accompanying drawings, in which FIGURE 1 is a perspective view of the sensing unit of the invention.

FIGURE 2 is a fragmentary, top plan view of the sensing unit of FIGURE 1 shown in juxtaposition to several cans.

FIGURE 3 is a diagrammatic drawing of the control circuit of the invention.

Referring now to FIGURES 1 and 2, the sensing unit is generally designated by the numeral 10 and it comprises two sensing heads 10a and 10b for sensing motion 10a and for sensing voids 10b, as will be apparent hereinafter. Each of the heads 10a and 10b comprises a pair of coils. The coils of head 10a are indicated as 11a and 12a and those of head 10b are indicated as 11b and 12b. Each head has a core 13 of ferromagnetic material. The cores of the two heads 10a and 10b are preferably magnetically separate. It will be noted that the coils 11a and 12a (and their core) are shorter than the coils 11b and 12b (and their core). More specifically, as will be seen by reference to FIGURE 2, wherein cans 18 are shown in juxtaposition to the sensing heads, the motion sensing head 10a is short, and does not span more than one can, whereas the void sensing head 10b is long and spans two or more cans. The significance of this difference in span is explained hereinafter.

The face 19 of the unit 10 will be called the "sensing face"; the coils 12a and 12b adjacent the sensing face 19 will be called the input or "face coils"; and the coils 11a and 11b, which are remote from the sensing face 19, will be called the "back coils." It will be understood that a suitable housing of steel or other suitable material is employed, and that a nonmagnetic plastic filling is employed to immobilize the interior parts of the sensing unit 10.

An adjustment screw 25 of ferrous metal is provided for each sensing head adjacent its back coil 11a or 11bb. By advancing or backing off the respective screw 25 the magnetic reluctance of such coil can be adjusted for a purpose explained hereinafter.

The sensing heads 10a and 10b are preferably assembled in a single unit as shown but they may be employed as separate units. Where employed as a single unit as shown at 10, the unit may be placed adjacent a can line. In such case it is the function of the sensing head 10a to sense the existence or nonexistence of motion of cans, and it is the function of the sensing head 10b to sense the presence or absence of voids in a line or file of cans. Thus if cans are intended to pass by in adjacent relation to the sensing face 19 as shown in FIGURE 2, it will be the function of the motion sensing head 10a to sense whether the cans are moving or are stopped, and it will be the function of the void sensing head 10b to sense whether there is a gap or void in the line of cans.

Referring now to FIGURE 3 the sensing heads 10a and 10b are there shown diagrammatically. The circuit is powered by a 60-cycle A.C. source 40. The circuit comprises primary coils 41 and 42 of a transformer 43 and a secondary coil 44 which has a center tap connected by a wire 45 to the cathode of a 2D21 thyratron tube 46 whose control grid is connected through a phase control condenser 47 to the center tap of coils 11a and 12a of motion sensing head 10a. The coils 44, 11a and 12a form a Wheatstone or balanced bridge type of circuit.

Similarly the center tap of secondary coil 47 is connected by a wire 48 to the cathode of a 2D21 thyratron tube 49 whose grid is connected through a phase control condenser 50 to the center tap or common connection of coils 11b and 12b of void sensing head 10b.

The adjustment screw 25 of the motion sensing head 10a is adjusted so that, when no can is adjacent the face coil 12a, the Wheatstone bridge comprising coils 44, 11a and 12a has an output which creates a potential between the control grid and cathode of tube 46 such that tube 46 conducts. Thus, if no can is adjacent the face coil 12a, or if a gap is opposite the face coil 12a, the tube 46 will conduct. However, when a can is directly opposite the face coil 12a the potential between the grid and cathode of tube 46 is such that the tube will not conduct. It will, therefore, be apparent that the tube 46 will pulse as long as cans pass by the motion sensing head 10a, but if cans stop the continued presence of a can adjacent the sensing head 10a will terminate pulsing of tube 46. This pulsing occurs at a frequency determined by the rate of movement of cans.

The adjustment screw 25 of void sensing head 10b is adjusted so that, when no can is adjacent the face coil 12b (i.e., when a void is adjacent coil 12b), the potential between the control grid and cathode of tube 49 is such that tube 49 conducts. However, when a can is adjacent the face coil 12b, the potential between the control grid and cathode of tube 49 is such that the tube does not conduct. The length of coil 12b and its core is such that the coil and its core bridge the normal spacing between cans. Therefore, as long as cans are spaced apart properly, i.e., there are no voids in the line of cans, the tube 49 is nonconducting.

As stated tube 46 conducts (at 60 cycles per second) whenever no can is opposite face coil 12a, and tube 46 is nonconducting whenever a can is opposite face coil 12a. Therefore tube 46 will pulse when cans pass by, each pulse corresponding to the passage of one can and consisting of a pulse of 60 cycle current. It is also apparent that the tube 49 remains nonconducting as long as no gap is adjacent coil 12b but that tube 49 conducts (at 60 cycles per second) whenever a gap occurs adjacent the face coil 12b.

The pulsing of tube 46 controls the charge on a condenser 55 which in turn controls the potential between the control grid and cathode of a 2D21 thyratron tube 56. A filter circuit consisting of resistors 57 and 58 and condensers 59 and 60 isolates the pulsing due to the movement of cans from the pulsing of the A.C. power source. The fluctuating potential thus applied to the control grid of tube 56 causes that tube to pulse as long as the tube 46 pulses, and it cause the tube 56 to pulse each time a can leaves the face coil 12a of motion sensing head 10a. When the motion of cans stops and tube 46 ceases to conduct, the tube 56 also ceases to conduct. It will be noted that the tube 56, because its control grid is isolated from the pulsing of the power source, remains nonconducting as long as motion ceases (whether a can is adjacent or is not adjacent the face coil 12a), and it is also nonconducting when a void occurs adjacent the face coil 12a.

As long as the former condition (movement of cans and consequent pulsing of tubes 46 and 56) persists, a charge is applied to a condenser 65. A neon glow tube 66 prevents the condenser 65 from discharging during alternate half cycles. The charge thus maintained on condenser 65 maintains the potential between the control grid and cathode of a 2D21 thyratron tube 67 such that tube 67 is nonconducting. The tube 67 controls a 2D21 thyratron tube 68, and as long as tube 67 is nonconducting the tube 68 conducts. The plate of tube 68 includes in its circuit the coil of a relay 69 which, therefore, remains energized as long as the tube 68 is conducting. The relay 69 in turn controls a signal (not shown) and/or a machine, such as a can filler or some other machine (not shown).

Assuming now that tube 56 ceases pulsing because of a stoppage of cans, the condenser 65 will discharge through a potentiometer 70 at a rate controlled by the setting of its movable contact. When the condenser 65 discharges to a predetermined point in a predetermined time, the tube 67 will commence to conduct. When tube 67 conducts it will charge a condenser 71, which is prevented from discharging during alternate half cycles by a neon glow tube 72. The charge on condenser 71 will create a potential between the control grid and cathode of tube 68 such that the latter tube will cease conducting and the relay will, therefore, be de-energized.

The relay 69, as stated, controls a signal and/or a machine. For example, it may light a warning lamp or sound a buzzer to indicate a stoppage of an movement and/or it may stop the operation of a filling machine.

When the stoppage ceases and motion recommences, tube 56 will commence pulsing again and tube 67 will cease to conduct. A predetermined time delay is, however, provided before the tube 68 again becomes conducting. This time delay is provided by a potentiometer 73 through which the condenser 71 must discharge when tube 67 ceases to conduct. The rate at which condenser 71 discharges is controlled by the setting of the adjustable contact of potentiometer 73.

The purpose of the adjustable time delays provided by potentiometers 70 and 73 may be illustrated as follows: If a can stoppage occurs and there are a number of unfilled cans in a filler to which the cans are being supplied, the delay will be such that all of the unfilled cans in the filler will be filled before the filler is stopped. On the other hand, when the motion of cans starts again, it may be desired to delay operation of the filler until all of the stations in the filler ahead of the filling spout are occupied by cans. The potentiometers 70 and 72 will be adjusted to effect appropriate time delays.

Commenting further on the motion control circuit, it will be noted that the phasing of tube 67 is reversed with respect to tubes 56 and 68. Therefore, as long as pulses are supplied by tube 56 the potential on condenser 65 is of the proper polarity and magnitude to hold the control grid of tube 67 below cut off and to prevent tube 67 from conducting, therefore, allows tube 68 to conduct.

Thyratron type tubes are preferred because the tube output is relatively insensitive to regulation of the current supply from a conventional 60 cycle, A.C. power source.

Relay 69 is connected across the A.C. power line through the primary winding 42 of transformer 43. To prevent chatter of the contacts of relay 69, a rectifier 75 is connected in parallel with the coil of relay.

Turning now to the void control aspect of the circuit, the tube 49, as explained above, conducts only when there is a void in the vicinity of its face coil 12b, and it is nonconductive when one or more cans are adjacent its face coil. Therefore, when a void occurs the tube 49 pulses at a frequency of 60 cycles per second, assuming that to be the frequency of the power source. The output of tube 49 charges the condenser 65. It will be recalled that, when a void is present, the tube 56 is nonconductive because it is isolated from the 60 cycle pulsing of the power source and it is sensitive only to the slower pulsing caused by movement of cans. It is not desired, however, to de-energize the relay 69 when a void is present. On the contrary, it is desired to continue the supply of cans. A separate void sensing device (not shown), such as a known type of no-can no-end device, may be employed to signal the presence of a void. In fact the output of the tube 49 may be used to actuate a signal and/or operate a relay, etc.

The function of the tube 49 will, therefore, be apparent. When a void occurs in a can line and, as a consequence, the tube 56 ceases operating, the tube 49 will take over, i.e., it will conduct and will continue to charge condenser 65, thereby keeping relay 69 energized in the manner explained hereinabove.

It will, therefore, be apparent that the sensing unit 10 and the circuit associated therewith are capable of sensing the presence or absence of motion of a line of can bodies or other metal objects, of actuating a signal and/or controlling a machine in response to stoppage of can movement, and of sensing a void and distinguishing between a void in and a stoppage of a can line.

I claim:

1. A control system of the character described for sensing motion of a line of metal objects such as cans and for also sensing the presence of a void in such line, said system comprising: A first electromagnetic sensing head pulsing at a frequency determined by the motion of such metal objects in its vicinity and a second electromagnetic sensing head pulsing when a void in such line of metal objects exists; said system also comprising an electrical element having a first state to be maintained during normal motion of metal objects past the sensing heads and also during the existence of a void in the vicinity of said heads, said electrical element having also a second state to be maintained in the event of stoppage of motion of said line of metal objects; said system also comprising a circuit linking the output of said heads to said electrical element to maintain the same in its first state during normal motion of metal objects and during the existence of a void therein adjacent the sensing heads and to maintain said electrical element in its second state during stoppage of motion of such objects adjacent said head.

2. The system of claim 1 including a delay means whereby the transition of said electrical element from either state to the other is delayed for a predetermined period of time.

3. A control system of the character described comprising an electrical element having an energized state and a de-energized state and a circuit for controlling said element, said circuit comprising a first tube having a plate circuit which energizes said element and a second tube so connected to the first tube that the first tube conducts only when the second tube is not conducting; said circuit also comprising a circuit for controlling operation of said second tube, said circuit including a first pulsing means adapted to produce a pulsing output corresponding to the motion of metal objects, such as cans, past and adjacent a sensing head and a second pulsing means adapted to produce a pulsing output in the absence of such metal objects, and means connecting both pulsing means to said second tube to maintain the same in a nonconducting state as long as either pulsing means is operating.

4. A sensing device of the character described adapted to be positioned adjacent to a conveyor for continuously advancing metal containers of uniform and predetermined span past said heads, comprising a first head and a second head each having a pair of coils and a core, one of said heads having a core of greater span than the other, said heads having reluctance adjusting means for balancing each pair of coils electromagnetically with a pair of input coils and so constructed and arranged that said advancing containers traverse said heads sequentially to alter the magnetic reluctance of first one and then the other of said input coils.

5. A sensing device of the character described adapted to be positioned adjacent to an advancing row of metal-containing container units of uniform and predetermined span, comprising a motion sensing head and an adjacent void sensing head; each head comprising a back coil, a face coil, a ferromagnetic core and a reluctance adjusting device for one of the coils to vary the reluctance of such coil for balancing said coils with a pair of input coils; the span of the face coil and the core of the void sensing head being greater than the span of the face coil and the core of the motion sensing head, so constructed and arranged that said advancing containers traverse said face coils sequentially to alter the magnetic reluctance of both of said face coils.

References Cited in the file of this patent

UNITED STATES PATENTS

| | | |
|---|---|---|
| 1,957,222 | Mershon | May 1, 1934 |
| 1,969,536 | Winne | Aug. 7, 1934 |
| 2,317,721 | Barnes | Apr. 27, 1943 |
| 2,481,345 | Reynst | Sept. 6, 1949 |
| 2,587,664 | Stout | Mar. 4, 1952 |
| 2,873,425 | Huggins | Feb. 10, 1959 |